Nov. 29, 1938.                A. F. MEYER                2,138,677
                         LIQUID MEASURING DEVICE
                          Filed Aug. 8, 1934
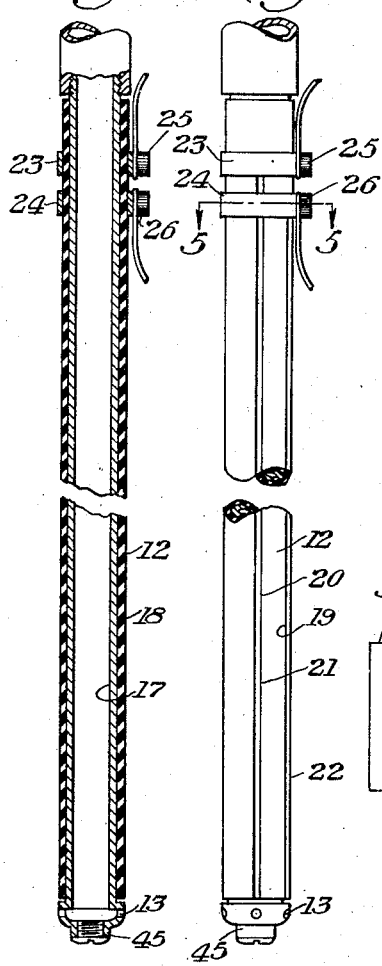
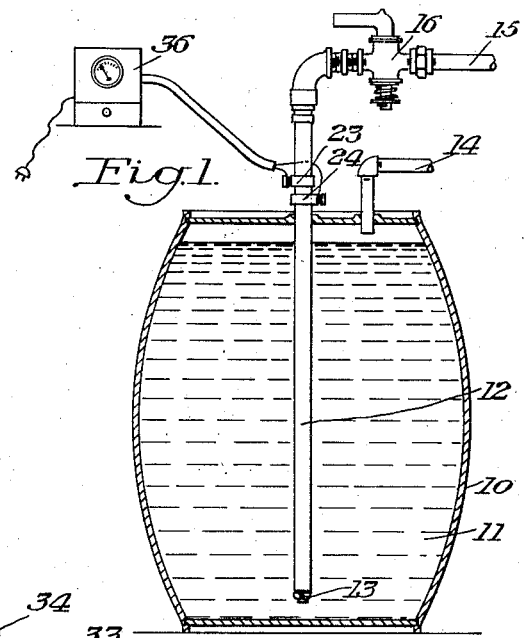
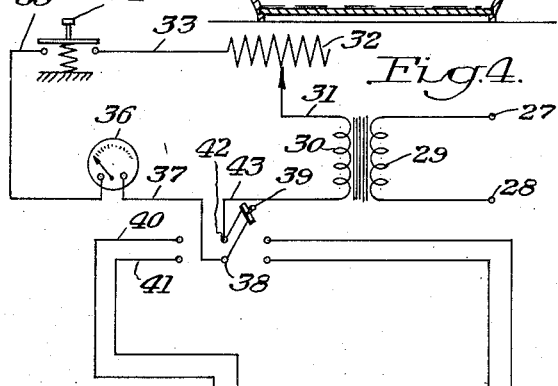
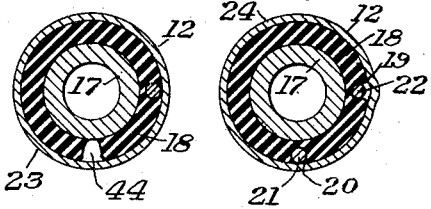
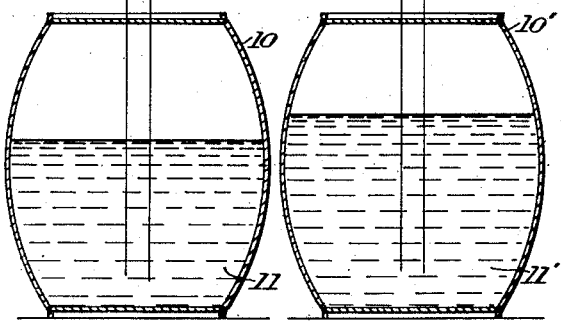
INVENTOR
Arthur F. Meyer
by Edward A. Lawrence
his Attorney Patented Nov. 29, 1938

2,138,677

UNITED STATES PATENT OFFICE 2,138,677

LIQUID MEASURING DEVICE

Arthur F. Meyer, Glendale, Calif., assignor of one-half to Charles A. Meyer, Pittsburgh, Pa.

Application August 8, 1934, Serial No. 738,949

6 Claims. (Cl. 201—48)

My invention relates to electrical apparatus for measuring the quantity of liquid in a container and is particularly directed to apparatus adapted to indicate the quantity of liquid in a container to the operator dispensing the liquid at the dispensing station when the container from which the liquid is being dispensed is placed remotely of said station or beyond the operator's vision.

Thus my invention may conveniently be applied to a beer dispensing station wherein the beer barrels or containers are located in a refrigerator or cool part of the building and the beverage is served from a more or less remote dispensing station.

Beer on draft contains a certain amount of undesirable sediment and after a barrel has been connected to the dispensing system precaution is taken not to disturb this sediment. However, this is difficult in an ordinary dispensing system because there is no means to check the quantity of beer in the barrel without disconnecting it from the dispensing system and without disturbing its contents. One of the present methods of finding the quantity of beer left in a barrel is to rock or kick it to determine the quantity of beer by the weight or splash. This disturbs the sediment and prevents the operator from serving clear beer from the barrel until the sediment has had time to settle to the bottom of the barrel.

One of the advantages of my invention is the provision of an apparatus, including an electrical circuit, arranged to register the quantity of beer in a barrel at the dispensing station without disturbing the sediment in the barrel.

Another object of my invention is to provide apparatus for measuring the quantity of beer in several barrels at a central dispensing station.

I attain these advantages by the provision of a novel draft pipe arranged to be inserted into the beer barrels for withdrawing beer therefrom and provided with electrodes which are exposed to the beer in the barrel approximately the full depth thereof. The electrodes may be made of resistance material so that the height of the liquid in the barrel determines the resistance of the operating circuit of the electrodes as the surface of the beer acts as the conductor between the electrodes and the resistance of the operating circuit will therefore vary in indirect proportion to the height of the liquid.

As a part of the circuit I provide a current reading instrument which registers the amount of current flowing between the electrodes when energized and is calibrated in terms of the quantity of the beer in containers. I am therefore enabled to use the same current measuring instrument for a number of beer barrels by providing a system of switches for connecting the instrument in the circuit of each individual barrel and my device thereby precludes disturbance of the barrels to determine the quantity of liquid remaining therein.

Other objects and advantages of my invention will appear hereinafter from the following description of my invention.

Referring to the accompanying drawing wherein I have illustrated a practical embodiment of the principles of my invention, Fig. 1 shows the draft pipe in elevation as applied to a liquid container.

Fig. 2 is an enlarged view of the lower end of my draft pipe, part of which is broken away.

Fig. 3 is a longitudinal section of Fig. 2.

Fig. 4 is a diagrammatic illustration of the circuit and its application to a series of liquid containers.

Fig. 5 is a cross section of the draft tube taken on the line 5—5 of Fig. 2.

Fig. 6 is a view similar to Fig. 5 showing a modified form of my draft tube employed as one of the electrodes.

Referring first to Figs. 1 to 5, inclusive of the drawing, 10 represents a barrel adapted for containing beer or other liquid 11 which is arranged to be dispensed therefrom through the draft pipe 12 inserted into the container from the top and provided with the openings 13 at its lower end which are spaced sufficiently from the bottom of the container to avoid drawing the sediment therefrom. 14 represents a pipe opening into the container near the top and is arranged to supply the barrel with air or a suitable gas under pressure for forcing the liquid out of the container through the dispensing line 15 to the dispensing station (not shown) which may be located remotely of the barrel. The draft pipe 12 is provided with the usual valve 16 for shutting off the dispensing line 15 from the container.

The draft pipe 12 comprises an inner pipe member 17 and sleeve 18 of insulating material which is telescoped thereon. The sleeve 18 is provided with the longitudinal grooves 19 and 20 which are arranged to carry the bare wire electrodes 21 and 22. The electrode 21 may be of low resistance material, such as copper, and the electrode 22 may be of high resistance material. Again both electrodes may be made of high resistance material. These electrodes extend along the draft pipe and up out of the container and are provided with the electrical contact rings 23 and 24 respectively which serve to electrically connect the elctrodes 21 and 22 with the binding posts 25 and 26.

Referring to Fig. 4, 27 and 28 represent the source of alternating current supply arranged to energize the transformer primary 29. This circuit may be provided with a switch and an adequate protective device for opening the circuit in case of emergency, but these devices not being a part of this invention are not shown.

One end of the secondary 30 is connected by the conductor 31 to the variable resistor 32, which in turn is connected by the conductor 33 to the push button 34. The conductor 35 in turn connects the push button 34 to one side of the ammeter 36, the other side being connected by the conductor 37 to the center pole 38 of the double pole double throw switch 39, which when thrown to the left connects the leads 40 and 41 representing the circuit through the binding post 25, the collar 23, the electrode 21, the liquid 11, the electrode 22, the collar 24, the binding post 26, and the lead 41. If the switch 39 were thrown to the right it would connect a circuit, similar to that described, in the barrel 10.

The secondary circuit is completed by the conductor 43 which connects the center pole 42 of the switch 39 to the other end of the secondary 30.

After the container to be measured has been selected by closing the switch 39, the push button 34 is depressed, thereby closing the secondary circuit and permitting current to flow therein and to be registered by the ammeter 36 which is provided with a scale reading directly in liquid measuring units. The current of the secondary circuit is adjusted by means of the variable resistor 32, so that the ammeter may properly record the full contents of the barrel before any of the contents is drawn therefrom. This adjustment is fixed for barrels of one specific capacity and the resistor may be marked or provided with indicating means which correspond to different size barrels, and when the resistor is positioned at a specific indication the circuit is calibrated to read the correct quantity of liquid in that specific size of barrel.

As the level of the liquid in the barrel becomes lower on the resistive electrodes 21 and 22, more resistance is added in the circuit. This reduces the current passing therethrough which is calibrated to be proportional to the liquid measure because the lineal resistance of the electrodes is chosen to produce that effect.

Referring to Fig. 6, 44 represents a longitudinal open seam along the insulating sleeve 18, permitting the liquid to come in contact with the metallic draft tube 17, which in this instance is also employed as one of the electrodes, as for instance in place of the electrode 21. When this modified draft tube is used the contact ring 23 is clamped around the upper end of the draft pipe 17 and connected to the circuit as previously described.

However if a liquid of relatively low resistance is being measured only one resistive electrode is required and metallic tip 45 at the bottom of the draft tube may be used as the other electrode. In this instance the current would travel through the body of liquid rather than bridging the electrodes at the surface of the liquid as previously described. If the liquid is of relatively high resistance this method cannot be used as there would be a material flow of current through the immersed portion of the resistive electrode forming a multiple circuit with the body of the liquid, permitting a greater quantity of current to flow through the circuit, thus incorrectly registering more liquid in the container than is actually present. To compensate for this discrepancy in the case of a high resistance liquid the resistance of the variable resistor 32 would have to be increased proportionately as the liquid was withdrawn from the barrel.

I claim:—

1. In a device arranged to be interposed in an electrical circuit for measuring a quantity of an electrically conducting liquid in a container, the combination of a metallic draft pipe arranged to be immersed in the liquid, and a longitudinal electrode carried by and insulated from said draft pipe and in parallel relation thereto, said electrode and draft pipe being exposed to the liquid.

2. In a device arranged to be interposed in an electrical circuit for measuring a quantity of an electrically conducting liquid in a container, the combination of a metallic draft pipe arranged to be immersed in the liquid, a tubular member of insulating material telescoped over the draft pipe and having a slot longitudinally thereof exposing the metallic draft pipe to the liquid, and a longitudinal electrode carried by the tubular member and insulated from said draft pipe and in parallel relation thereto, said electrode being exposed to the liquid.

3. In a device arranged to be interposed in an electrical circuit for measuring a quantity of an electrically conducting liquid in a container, the combination of a metallic draft pipe arranged to be immersed in the liquid, a tubular member of insulating material telescoped over the draft pipe and a plurality of longitudinal electrodes carried by the tubular member and insulated from each other and from said draft pipe, said electrodes being in parallel relation to each other and to said draft pipe and exposed to the liquid.

4. In an apparatus of the class described, a container, a liquid dispensing tube inserted in the container and comprising an outer shell or jacket of insulating material, and a pair of electrodes supported in longitudinal grooves provided in the periphery of said insulating jacket, whereby the electrodes will directly engage the liquid in the container to thereby permit the liquid to complete a circuit therebetween.

5. In an apparatus of the class described, a closed container such as a keg, a suction tube supported in the upper wall of the container and extending downwardly into the container and having its lower end terminating adjacent the bottom wall thereof, an electric circuit, and a pair of electrodes connected in said circuit and suitably supported on said suction tube in insulated relation and extending substantially the full length thereof within the container, said electrodes contacting directly with the liquid in the container, whereby the liquid will provide a conductor between said electrodes to complete the circuit, and whereby variations in the level of the liquid will vary the flow of current through the circuit.

6. In a device arranged to be interposed in an electrical circuit for measuring a quantity of an electrically conducting liquid in a container, the combination of a draft pipe arranged to be immersed in the electrically conducting liquid, said draft pipe comprising a tube of electrically insulating material which extends substantially the full length of the container and a metallic electrode supported in a longitudinal groove in the periphery of said insulating tube in such a manner that it does not project beyond the peripheral surface of the tube, said metallic electrode being exposed to the liquid.

ARTHUR F. MEYER.